(12) United States Patent
Woehrle

(10) Patent No.: US 8,036,007 B2
(45) Date of Patent: Oct. 11, 2011

(54) BUS CONNECTION FOR CONNECTING A FIELD DEVICE TO A FIELD BUS

(75) Inventor: Siegbert Woehrle, Schiltach (DE)

(73) Assignee: Vega Grieshaber KG, Wolfach (DE)

( * ) Notice: Subject to any disclaimer, the term of this patent is extended or adjusted under 35 U.S.C. 154(b) by 15 days.

(21) Appl. No.: 12/585,281

(22) Filed: Sep. 10, 2009

(65) Prior Publication Data

US 2010/0060247 A1     Mar. 11, 2010

Related U.S. Application Data

(60) Provisional application No. 61/136,514, filed on Sep. 11, 2008.

(30) Foreign Application Priority Data

Sep. 11, 2008     (EP) .................................... 08016053

(51) Int. Cl.
    *H02J 1/10* (2006.01)
(52) U.S. Cl. .......................................... 363/65; 363/69
(58) Field of Classification Search .................. 363/65, 363/89, 21.14, 21.04, 17, 64, 66, 67, 68, 363/69; 307/15, 16, 26, 28, 36
    See application file for complete search history.

(56) References Cited

U.S. PATENT DOCUMENTS

| | | | | |
|---|---|---|---|---|
| 6,172,885 | B1 * | 1/2001 | Feldtkeller | 363/21.1 |
| 6,809,678 | B2 * | 10/2004 | Vera et al. | 341/166 |
| 7,230,219 | B2 * | 6/2007 | Miyazaki et al. | 219/715 |
| 2004/0022074 | A1 * | 2/2004 | Takamatsu | 363/20 |
| 2005/0231989 | A1 * | 10/2005 | Shao et al. | 363/125 |
| 2008/0174178 | A1 | 7/2008 | Jakobsson et al. | |

FOREIGN PATENT DOCUMENTS

WO     WO 96/04735 A1     2/1996

* cited by examiner

*Primary Examiner* — Adolf Berhane
*Assistant Examiner* — Nguyen Tran
(74) *Attorney, Agent, or Firm* — The Nath Law Group; Jerald L. Meyer; Robert T. Burns

(57) ABSTRACT

A bus connection for connecting a field device to a field bus whereby the bus connection has a circuit for sending and receiving databus signals and for generating at least one regulated operating voltage, and the regulated operating voltage is generated from a bus voltage supplying the field bus, characterized in that a controllable resistor is provided for generating an additional operating voltage; circuitry means are provided, controlling the controllable resistor as a function of the bus voltage such that the input voltage of the circuit is regulated at its minimum required power supply voltage; and the sum of the regulated operating voltage and the additional operating voltage is supplied to the field device as the power supply voltage.

12 Claims, 4 Drawing Sheets

BUS CONNECTION FOR CONNECTING A FIELD DEVICE TO A FIELD BUS

This is a Non-Provisional Application claiming benefit of U.S. Provisional Patent Application Ser. No. 61/136,514, filed on Sep. 11, 2008 and claiming priority benefit from EP Application No. 08 016 053.4, filed Sep. 11, 2008, the entire content of which is hereby incorporated by reference in its entirety.

The exemplary embodiments disclosed below relate to a bus connection for connecting a field device a field bus.

In process automation and process control, so-called field devices are used to measure the process variables by means of sensors, for example, or to control the controlled variables by means of actuators in the process sequence.

Various types of measurement devices used in measurement and control technology, e.g., pressure gauges, thermometers, flow meters and filling level gauges are used as the sensors here. The measured signals supplied by these measuring devices are usually forwarded to a higher-level control station or control center, where the signal is transmitted in digital form over a databus between the field device and the control station or control center. Field buses such as PROFIBUS, ETHERNET or Fieldbus Foundation are used here.

The bus connection is accomplished by bus connections or connecting circuits, which perform the sending and receiving functions required for communication over a field bus, in particular performing the level adjustment, using special circuits, so-called transceivers (medium attachment units).

Such transceivers are usually implemented with microprocessors, ASICs or by FPGAs. The company Siemens, for example, offers an ASIC circuit SIM 1 with which field devices can be connected to a field bus, in particular to a PROFIBUS with a few external components. In addition to the analog sensor part, the field devices connected in this way comprise a microprocessor (application controller) for controlling the application and a slave controller as the process controller for controlling the bus connection.

Frequently the field devices are not connected to an external voltage source but instead are supplied with power over the databus line (bus-powered), i.e., the bus voltage is applied as input voltage to the bus connection.

Figure 1:
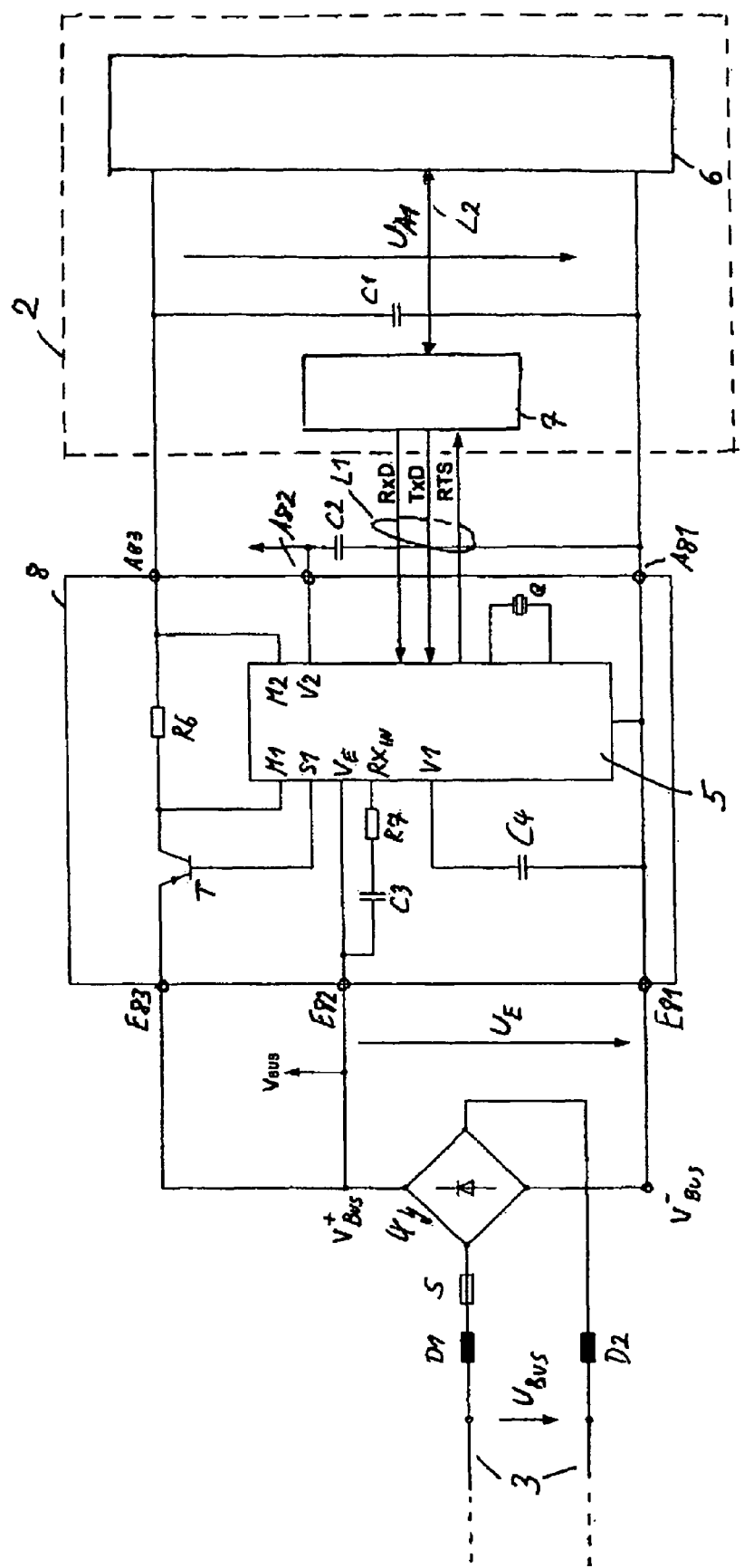

FIG. 1 shows a bus-powered bus connection comprising the aforementioned ASIC circuit SIM1 (SIMATIC NET), which connects a field device 2 to a field bus 3, namely a PROFIBUS here.

For connecting the field device 2 to the field bus 3, according to FIG. 1 a coupling and voltage regulating circuit 8 is connected to the dual-core PROFIBUS 3, hereinafter referred to as a field bus, via a rectifier bridge 4. A line choke D1 and a fuse S are connected serially between the rectifier bridge 4 and one core of the field bus 3 and/or a line choke D2 is connected. The bus voltage $U_{Bus}$ is supplied by a segment coupler (not shown), for example, and covers a voltage range from 9V to 32V, for example.

The coupling and voltage regulating circuit 8 is connected to the field device 2 over data lines L1 for transmitting the RxD, TxD and RTS data. The field device 2 consists of a digital part 7, to which the data line L1 is connected, and a sensor part 6, which assumes the function of a measurement device, as explained above, and is connected by a databus L2 to the digital part 7.

The aforementioned ASIC circuit SIM1 from Siemens, hereinafter referred to as circuit 5, is responsible for communication between the digital part 7 of the field device 2 and the field bus 3 in the coupling and voltage regulating circuit 8 and it also supplies several power supply voltages for local consumers, in particular for the digital part 7 and the sensor part 6, whereby the bus voltage $U_{Bus}$ tapped at the rectifier bridge serves as the power supply voltage for the circuit 5. The negative bus potential $V^-_{Bus}$ is sent to the coupling and voltage regulating circuit 8 via the input E81 to the circuit 5, while the positive bus potential $V^+_{Bus}$ is sent over an input E82 of the coupling and voltage regulating circuit 8 to the power supply of an input $V_E$ of the circuit 5 and is sent via a capacitor C3 and a resistor R7 for input of a field bus reception signal to an input $RX_{IN}$ of the circuit 5. Furthermore, the positive potential $V^+_{Bus}$ is sent to a in-phase regulator consisting of a bipolar transistor T and a measuring shunt R6 via an input E83 of the coupling and voltage regulating circuit 8 and is regulated by the circuit 5 at a constant operating voltage $U_{A1}$, preferably 6.3V. To this end, a control signal for controlling the base electrode of the transistor T is generated from the voltage drop of the shunt resistor R6 sent to the measuring inputs M1 and M2 of the circuit 5. The operating voltage $U_{A1}$ available at the outputs A81 and A83 of the coupling and voltage regulating circuit 8 is supported by a capacitor C1.

In addition, regulated power supply voltages of 3V and 5V are available for external consumers at the outputs V1 and V2 of the circuit, each being supported by a capacitor C2 and/or C4, respectively.

In this application according to FIG. 1, the regulated operating voltage $U_{A1}$ of 6.3V is selected so that at the lowest bus voltage $U_{Bus}$ of 9V, reliable modulation of the field bus signal is possible. Since the field bus voltage $U_{Bus}$ covers a value range from 9V to 32V, the remainder on the in-phase regulator (T, R6) drops at a higher bus voltage $U_{Bus}$ than 9V and is converted to heat. In practice, it has been found that bus voltages $U_{Bus}$ much higher than 9V usually occur.

An object of the disclosed exemplary embodiments is therefore to provide a bus connection of the type defined above with the lowest possible electric losses.

According to the present invention, such a bus connection with a circuit for sending and receiving databus signals and for generating at least one regulated operating voltage derived from the bus voltage comprises at least one controllable resistor for generating an additional operating voltage and circuitry means for triggering the controllable resistor as a function of the bus voltage, such that the input voltage of the circuit is regulated at its minimum required power supply voltage level, so the sum of the regulated operating voltage and the additional operating voltage is sent as the power supply voltage to the field device.

Thus the circuit is no longer burdened with the total bus voltage but instead only with the minimum required power supply voltage, so that comparatively minimal losses are generated which are still far below this loss level, even with the additional circuitry means.

With this inventive bus connection, the total bus voltage minus a residual voltage required for signal modulation on the in-phase regulator and the voltage loss of the input wiring (rectifier, fuse and line chokes) is used as the power supply voltage for the field device and/or for the function units (digital part, sensor part, etc.) of the field device, so that there is a great variability with regard to the use of the function units of the field device, in particular of the meter to be used as a sensor part.

In a further embodiment of the invention, an operational amplifier is provided as circuitry means to which a reference voltage derived from the bus voltage is sent for setting the minimum required power supply voltage, whereby the reference voltage is preferably based on a potential of the bus voltage and is preferably generated at a reference diode. Thus a standard component is made available, with which inexpensive regulation of the power supply voltage for the circuit is made possible.

In another further embodiment of the invention, the reference voltage is based on the reference potential and/or ground potential of the circuit, thus making it possible to use a standard operational amplifier, with the result that construction costs for the inventive bus connection can be further lowered. In this further embodiment, the reference voltage is preferably tapped at a reference diode.

In a further embodiment of the invention, circuitry means, preferably a Z-diode, which limits the power supply voltage of the operational amplifier to an appropriate voltage level are provided, because in this way a comparatively inexpensive standard operational amplifier can be used. The power supply voltage may be adjusted to such a level that the operational amplifier is not overloaded.

In another further embodiment of the invention, a bipolar transistor or a field effect transistor (FET) is used as the controllable resistor, because these transistors are available as inexpensive components.

In adapting the additional operating voltage to the power supply voltage range of the field device and/or its function units, this operating voltage is limited by circuitry means, preferably a Z-diode, to a correspondingly suitable voltage range.

A field device preferably includes a digital part and a sensor part; the digital part comprises a level converter and a step-down converter, for example.

Figure 2:
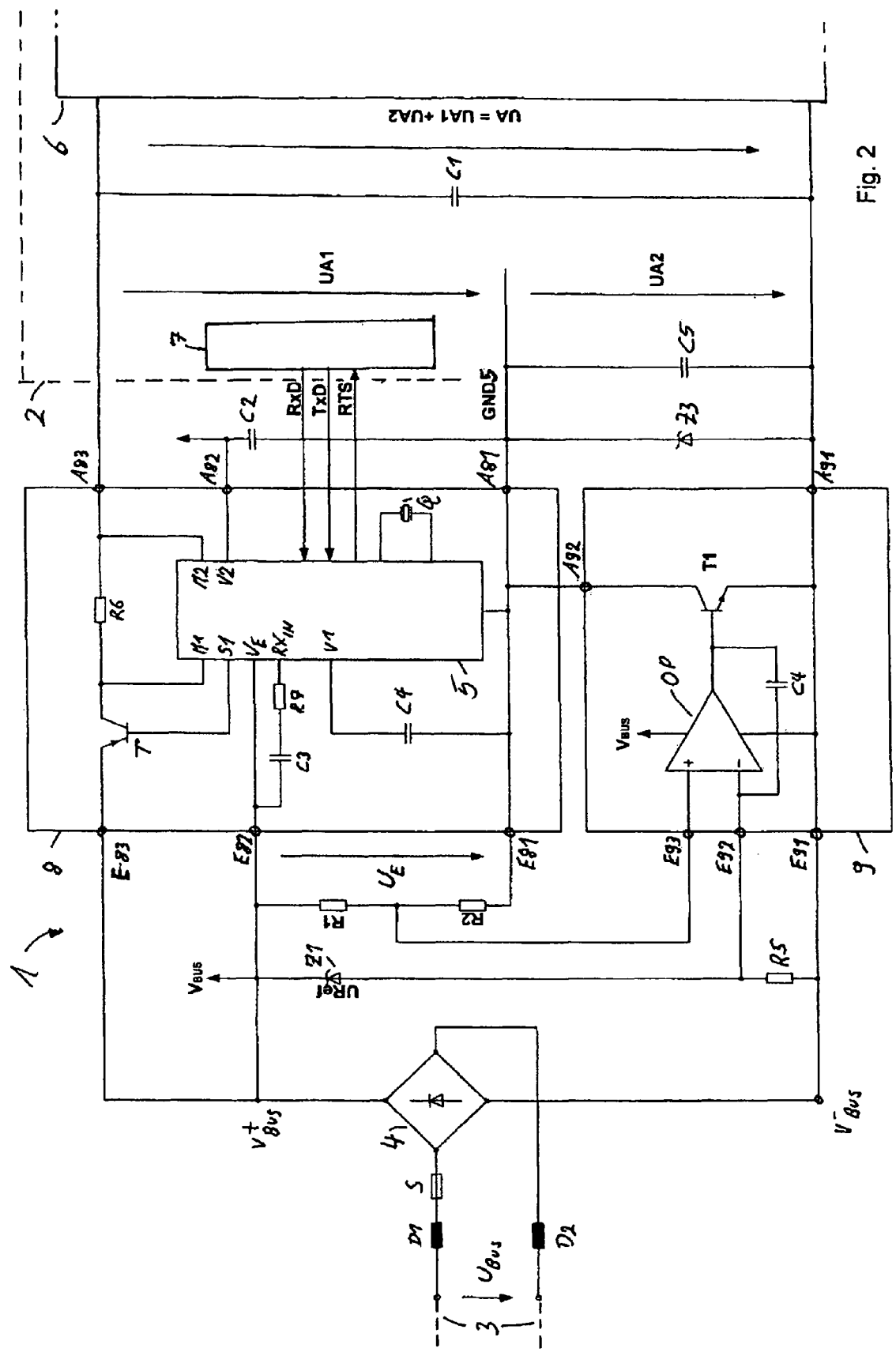
Figure 3:
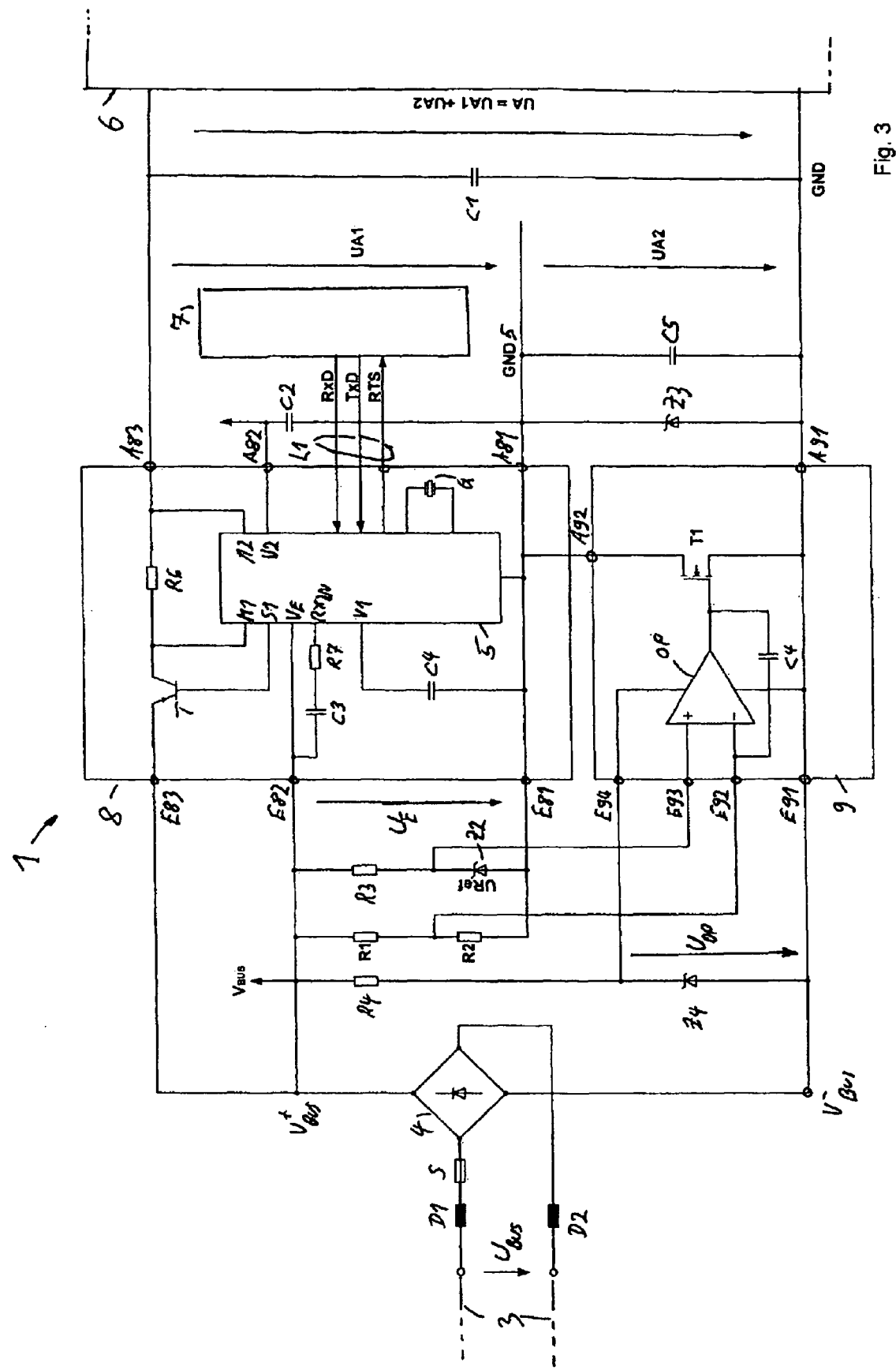
Figure 4:
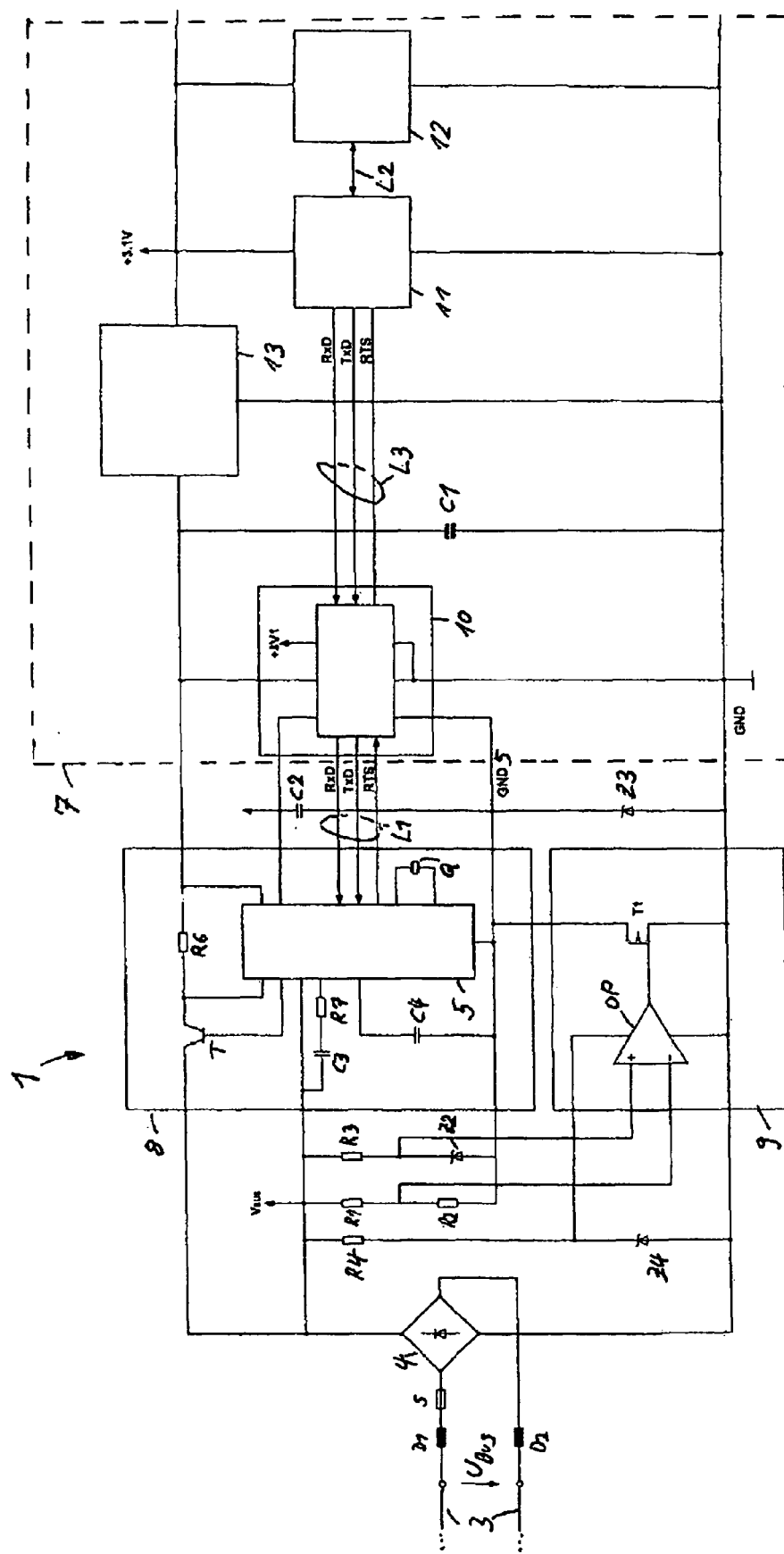

The invention is described in greater detail below on the basis of exemplary embodiments with reference to the accompanying figures, in which:

FIG. 1 shows a circuit diagram of a known bus connection with a circuit comprising the function of a transceiver, FIG. 2 shows a circuit diagram of an embodiment of the inventive bus connection, FIG. 3 shows a circuit diagram of another embodiment of the inventive bus connection, and FIG. 4 shows a circuit diagram of the inventive bus connection according to FIG. 3, including a digital part of a field device.

FIG. 1 shows the bus connection known and described above with regard to structure and function, comprising a coupling and voltage regulating circuit 8, which comprises a circuit 5 for the sending and receiving functions and for generating a regulated operating voltage $U_{A1}$.

FIG. 2 shows an exemplary embodiment of the inventive bus connection 1 with a coupling and voltage regulating circuit 8, which corresponds to that according to FIG. 1 with regard to design and function. The field device 2 downstream from the bus connection 1 also corresponds in design and function to the field device 2 illustrated in FIG. 1.

Therefore, only the parts of the exemplary embodiment that are essential to the invention are described below with regard to their design and function.

According to FIG. 2, the input voltage $U_E$ of the circuit 5 is regulated at its minimum required power supply voltage level by means of a regulating circuit 9 having an operational amplifier OP. To do so, the output of the operational amplifier OP controls the base electrode of a bipolar transistor T1 whose emitter-collector section is connected to the reference potential GND5 via an output A92 on the one hand (corresponding to the potential of the input E81 and the output A81 of the coupling and voltage regulating circuit 8) and on the other hand together with an output A91 and an input E91 of the regulating circuit 9 is at the negative potential $V^-_{Bus}$ of the bus voltage $U_{Bus}$. In addition to the regulated operating voltage $U_{A1}$, an additional operating voltage $U_{A2}$ is applied at the outputs A92 and A91 of the regulating circuit 9, depending on the control of the transistor T1 by the operational amplifier OP, so that the sum of $U_{A1}$ plus $U_{A2}$ of these two operating voltages $U_{A1}$ and $U_{A2}$ is available at the outputs A83 and A91, this total voltage being referred to below as the power supply voltage $U_A$.

The additional operating voltage $U_{A2}$ and the power supply voltage $U_A$ for the field device 2 are supported by a capacitor C5 and/or C1, respectively.

The output of the operational amplifier OP is additionally coupled back to its inverting input via a capacitor C4 and receives almost the entire bus voltage $U_{Bus}$ as the operating voltage (minus the losses at the rectifier bridge 4, the fuse S and the line chokes D1 and D2).

To generate a reference voltage $U_{Ref}$ required for regulating the input voltage $U_E$, the inverting input of the operational amplifier OP is connected via an input E92 of the regulating circuit 9 to a connecting node of the series connection of a reference diode Z1 and a resistor R5, whereby the cathode of the reference diode Z1 is connected to the positive potential $V^+_{Bus}$ of the bus voltage $U_{Bus}$ and the free end of the resistor R5 is connected to the negative potential $V^-_{Bus}$ of the bus voltage $U_{Bus}$. The noninverting input of the operational amplifier OP is connected via an input E93 of the regulating circuit 9 to a voltage tap of a voltage divider comprising resistors R1 and R2 to which the input voltage $U_E$ for the circuit 5 is applied via its two inputs E81 and E82.

The reference diode Z1 is selected so that a reference voltage of −2.5V based on the positive potential $V^+_{Bus}$ of the bus voltage $U_{Bus}$ is applied at the inverting input of the operational amplifier OP. Because of a differential voltage at the two inputs of the operational amplifier OP, a bipolar transistor T1 connected to its output is controlled via its base electrode until a value corresponding to the value of the reference voltage $U_{Ref}$ is also applied to its noninverting input in the fully regulated state.

If the values 100 kΩ and 221 kΩ are selected for the two resistors R1 and R2 forming the voltage divider, this yields a voltage value of 8.025V for the input voltage $U_E$ of the circuit 5 according to the following equation:

$$U_E = U_{Ref} \times (R1+R2)/R1.$$

The transistor T1 is thus controlled in such a way that an input voltage $U_E$ of 8.025V is set on the voltage divider R1/R2, i.e., at the input E81/E82 of the circuit 5.

At a bus voltage $U_{Bus}$ of 20V, for example, and with a voltage drop of approx. 1V across the input wiring (rectifier 4, fuse S and line chokes D1 and D2) a voltage value of approx. 11V is obtained for the additional operating voltage $U_{A2}$ with $U_{A2} = 20V - 8.025V - 1V$.

As illustrated in FIG. 1, the circuit 5 regulates the positive potential $V^+_{Bus}$ of the bus voltage $U_{Bus}$ at a constant value of 6.3V, corresponding to the regulated operating voltage $U_{A1}$ at the outputs A83 and A81 of the coupling and voltage regulating circuit 8 by means of the in-phase regulator, which is formed by the transistor T and the resister R6, so a voltage value of 17.3V is obtained as the power supply voltage $U_A$ for the field device 2 and/or its function units 7 and 6 according to $U_A = U_{A1} + U_{A2} = 6.3V + 11V$.

To limit the additional operating voltage $U_{A2}$ to a value adapted to the field device 2 and/or its function components, a Z-diode Z3 is connected at the outputs A92 and A91 of the regulating circuit 9.

The inventive bus connection 1 according to FIG. 3 differs from that according to FIG. 2 with regard to the level of the power supply voltage of the operational amplifier and with regard to the generation of the reference voltage $U_{Ref}$, the difference lying only in the fact that it generates the reference voltage $U_{Ref}$.

According to FIG. 2, the total bus voltage $U_{Bus}$ (minus the voltage drop of the input wiring) is applied as the power supply voltage to the operational amplifier OP of the regulating circuit 9 and thus this would require an operational amplifier suitable for the voltage range from 9V to 32V of the bus voltage $U_{Bus}$. According to FIG. 3, the power supply voltage of the operational amplifier OP is therefore limited by means of a Z-diode Z4, in coordination with the reference diode Z2 and the Z-diode Z3, to a value such that the inputs E92 and E93 of the operational amplifier OP are not overloaded. To do so, an input E94 of the regulating circuit 9, which is connected to an operating terminal of the operational amplifier OP, is connected to a connecting node of a series connection of a Z-diode Z4 and a resistor R4 whereby the anode of the Z-diode 74 is at the negative potential $V^-{}_{Bus}$ of the bus voltage $U_{Bus}$ and the free end of the series connection of the resistor R4 is at the positive potential $V^-{}_{Bus}$ of the bus voltage $U_{Bus}$. It is thus possible to use an inexpensive standard operational amplifier for the regulating circuit 9.

According to FIG. 3, the reference voltage $U_{Ref}$ for the operational amplifier OP is no longer based on the bus voltage $U_{BUS}$ but instead is based on the reference potential GND5 of the circuit 5. Therefore the inverting input of the operational amplifier OP is connected to the voltage divider R1/R2 via the input E92 of the regulating circuit 9 while the series connection of a reference diode Z2 is connected to a resistor R3 between the positive potential $V^+{}_{Bus}$ of the bus voltage $U_{Bus}$ and the reference potential of the circuit 5. The reference voltage $U_{Ref}$ is picked up from the reference diode Z2 and the resistor R3 and is applied to the noninverting input of the operational amplifier OP via the input E93 of the regulating circuit 9.

Due to the use of a field effect transistor (FET) T1 instead of a bipolar transistor, the electric current consumption of the regulating circuit 9 can be minimized because it does not require a current for control. Therefore the additional bus load can also be kept low.

FIG. 4 shows a bus connection 1 according to FIG. 3 with a digital part 7 of a field device according to FIG. 2 or 3, connected downstream from this bus connection 1. This digital part 7 comprises a level converter 10 which is connected on the one hand to the data lines L1 with the circuit 5 and via the data lines L3 to a downstream slave controller 11 as the process controller. A microprocessor 12, as the applications controller connected via a databus L2, is connected downstream from this slave controller 11. The level converter 10 is supplied with the power supply voltage $U_A$ via the outputs A91 and A83 (see FIG. 3), comprising the sum of the regulated operating voltage $U_{A1}$ and the additional operating voltage $U_{A2}$, while the slave controller 11 and the microprocessor 12 are supplied with a lower voltage in comparison with the power supply voltage $U_A$, this lower voltage being generated by a step-down converter 13 from the power supply voltage $U_A$. For example, if the power supply voltage $U_A$ is 17V, then the step-down converter 13 will generate an operating voltage of 3.1V from this for the slave controller 11 and the microprocessor 12. Thus the power loss of the digital part 7 can be minimized. Since these units 11 and 12 are at a different potential, the level converter 10 is necessary for data communication. According to FIG. 4, the reference potential GND5 of the circuit 5 is also applied to the level converter 10 and the 3V power supply voltage generated by the circuit 5 is also sent via the output A82 (FIG. 3).

LIST OF REFERENCE NUMERALS 1 bus connection
2 field device
3 field bus lines
4 rectifier bridge
5 circuit
6 sensor part of the field device 2
7 digital part of the field device 2
8 coupling and voltage regulating circuit
9 regulating circuit
10 level converter
11 slave controller
12 microprocessor
13 step-down converter
A81-A83 outputs of the coupling and voltage regulating circuit 8
A91-A92 outputs of the regulating circuit 9
C-C5 capacitors
D1, D2 diodes
E81-E83 inputs of the coupling and voltage regulating circuit 8
E91-E94 inputs of the regulating circuit 9
GND reference potential of the bus connection 1
GND5 reference potential of circuit 5
L1, L2, L3 data lines
M1, M2 measurement inputs of the circuit 5
OP operational amplifier
Q quartz
R1-R7 resistors
$RX_{IN}$ data input of the circuit 5
S fuse
S1 control output of the circuit 5
T, T1 transistors
$U_{Bus}$ field bus voltage
$U_E$ input voltage of the circuit 5
$U_A$ power supply voltage for the field device 2
$U_{A1}$ regulated operating voltage
$U_{A2}$ additional operating voltage
$U_{OP}$ operating voltage of the operational amplifier OP
$U_{Ref}$ reference voltage
V1, V2 voltage outputs of the circuit 5
$V^+{}_{Bus}$, $V^-{}_{Bus}$ positive/negative potential of the field bus voltage
Z1-Z4 Z-diodes and/or reference diodes

The invention claimed is:

1. A bus connection (1) for connecting a field device (2) to a field bus (3) whereby the bus connection (1) has a circuit (5) for sending and receiving databus signals (RxD, TxD, TRS) and for generating at least one regulated operating voltage ($U_{A1}$), and the regulated operating voltage ($U_{A1}$) generated from a bus voltage ($U_{Bus}$) supplying the field bus (3), comprising:
a controllable resistor (T1) configured to generate an additional operating voltage ($U_{A2}$);
circuitry (OP, R1, R2, R3, R5, Z1, Z2) configured to control the controllable resistor (T1) as a function of the bus voltage ($U_{Bus}$) such that:
the input voltage ($U_B$) of the circuit (5) is regulated at its minimum required power supply voltage,
circuit (5) and the controllable resistor (T1) are connected to the bus voltage ($U_{Bus}$) in series, and
the sum of the regulated operating voltage ($U_{A1}$) and the additional operating voltage ($U_{A2}$) is supplied to the field device (2) as the power supply voltage ($U_A$).

2. The bus connection (1) according to claim 1, wherein the circuitry further comprises an operational amplifier (OP) which receives a reference voltage ($U_{Ref}$) derived from the bus voltage ($U_{Bus}$).

3. The bus connection (1) according to claim 2, characterized in that the reference voltage ($U_{Ref}$) is based on a potential ($V^+_{Bus}$) of the bus voltage ($U_{Bus}$).

4. The bus connection (1) according to claim 2, characterized in that the reference voltage ($U_{Ref}$) is based on the reference potential (GND5) of the circuit (5).

5. The bus connection (1) according to claim 2, characterized in that the reference voltage ($U_{Ref}$) is supplied at a Z-diode (Z1, Z2) which is connected in series with a series resistor (R3, R5).

6. The bus connection (1) according to claim 2, characterized in that circuitry means (R4, Z4) are provided for limiting the operating voltage ($U_{OP}$) of the operational amplifier (OP).

7. The bus connection (1) according to claim 1, characterized in that a bipolar transistor (T1) is provided as the controllable resistor.

8. The bus connection (1) according to claim 1, characterized in that a field effect transistor (T1) is provided as the controllable resistor.

9. The bus connection (1) according to claim 1, characterized in that a circuitry means (Z3) preferably a Z-diode is provided for limiting the additional output voltage ($U_{A2}$).

10. The bus connection (1) according to claim 1, characterized in that the field device (2) comprises a digital part (10, 11, 12, 13) and a sensor part (6).

11. The bus connection (1) according to claim 10, characterized in that the sensor part (6) receives the sum of the regulated operating voltage (Um) and the additional operating voltage ($U_{A2}$) as the power supply voltage ($U_A$).

12. The bus connection (1) according to claim 10, characterized in that the digital part of the field device (2) comprises a level converter (10) and a step-down converter (13) to which the sum of the regulated operating voltage ($U_{A1}$) and the additional operating voltage ($U_{A2}$) is supplied as the power supply voltage ($U_A$).

\* \* \* \* \*